(12) United States Patent
Wei (10) Patent No.: US 10,705,632 B2
(45) Date of Patent: Jul. 7, 2020

(54) TOUCH PANEL INCLUDING STEEPED SENSING LINES

(71) Applicants: AU Optronics (Suzhou)Corp,.Ltd, Suzhou (CN); AU Optronics Corporation, Hsinchu (TW)

(72) Inventor: Guangdong Wei, Jiangsu (CN)

(73) Assignees: AU Optronics (Suzhou)Corp., Ltd, Suzhou (CN); Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/264,694

(22) Filed: Feb. 1, 2019

(65) Prior Publication Data

US 2019/0243478 A1    Aug. 8, 2019

(30) Foreign Application Priority Data

Feb. 5, 2018  (CN) .......................... 2018 1 0112651

(51) Int. Cl.
 *G06F 3/041* (2006.01)
 *G06F 3/0488* (2013.01)
 *G06F 3/044* (2006.01)

(52) U.S. Cl.
 CPC .............. *G06F 3/041* (2013.01); *G06F 3/044* (2013.01); *G06F 3/0416* (2013.01); *G06F 3/04886* (2013.01)

(58) Field of Classification Search
 CPC ........ G06F 3/0416; G06F 3/041; G06F 3/044; G06F 3/04815; G06F 3/04886; G06F 2203/04103
 See application file for complete search history.

(56) References Cited

U.S. PATENT DOCUMENTS

| 7,466,307 | B2 | 12/2008 | Trent, Jr. et al. |
| 7,786,981 | B2 | 8/2010 | Proctor |
| 10,437,380 | B2 * | 10/2019 | Wei ...................... G06F 3/0416 |
| 2004/0252109 | A1 * | 12/2004 | Trent, Jr. ............ G06F 3/03547 345/174 |
| 2008/0047765 | A1 * | 2/2008 | Proctor ............... G06F 3/03547 178/18.06 |

(Continued)

FOREIGN PATENT DOCUMENTS

| CN | 202075723 | 12/2011 |
| CN | 203773526 | 8/2014 |
| CN | 204360355 | 5/2015 |

(Continued)

OTHER PUBLICATIONS

Anonymous, "Multi-touch system based on spherical display," Application of Electronic Technique, Sep. 11, 2015, with machine English translation, pp. 1-12.

*Primary Examiner* — Vijay Shankar
(74) *Attorney, Agent, or Firm* — JCIPRNET (57) ABSTRACT

A touch panel including first sensing lines and second sensing lines is provided. The first sensing lines are separated from each other. Each of the first sensing lines includes first arc segments and first straight segments. Each of the first straight segments is connected between two adjacent first arc segments. Different first arc segments have different radii about a center and cover different ranges of azimuth about the center. The second sensing lines are separated from each other and are intersected with the first sensing lines.

22 Claims, 8 Drawing Sheets

(56) References Cited

U.S. PATENT DOCUMENTS

2013/0147743 A1  6/2013  Ludwig
2018/0329566 A1  11/2018  Wei

FOREIGN PATENT DOCUMENTS

CN    105824476    8/2016
TW      I588730    6/2017
TW      I627576    6/2018

* cited by examiner

TOUCH PANEL INCLUDING STEEPED SENSING LINES

CROSS-REFERENCE TO RELATED APPLICATION

This application claims the priority benefit of China application serial no. 201810112651.8, filed on Feb. 5, 2018. The entirety of the above-mentioned patent application is hereby incorporated by reference herein and made a part of this specification.

BACKGROUND OF THE INVENTION

Field of the Invention

The disclosure relates to a panel, and in particular, to a touch panel.

Description of Related Art

In recent years, touch screens have been extensively used in digital products including mobile phones, tablet computers, smart watches, smart wristbands, etc. Common touch screens are almost all rectangular, and when a circular or non-rectangular screen is to be manufactured, wiring layout inside the touch screen may need to be re-designed. To realize a circular touch screen, one of the most conceivable wiring methods is wiring along a radial direction and along a circumferential direction. However, in such wiring method, the wires distributed along the circumferential direction do not form complete circles but are discontinuous in partial ranges of azimuth to reserve a wiring space for outer leads. The outer leads connect the wires distributed along the circumferential direction and lead them from inside the screen to be joined to a driving circuit or a chip. Accordingly, the wiring space of the outer leads and the corresponding ranges of azimuth cannot be provided with touch sensing functions.

SUMMARY OF THE INVENTION

The embodiments of the invention provide a touch panel that is configured with sensing lines in all ranges of azimuth to achieve comprehensive touch sensing.

A touch panel according to an embodiment of the invention includes a plurality of first sensing lines and a plurality of second sensing lines. The first sensing lines are separated from each other. Each of the first sensing lines includes a plurality of first arc segments and a plurality of first straight segments. Each of the first straight segments is connected between two adjacent first arc segments. Different first arc segments have different radii about a center. Different first arc segments cover different ranges of azimuth about the center. The second sensing lines are separated from each other and are intersected with the first sensing lines.

In an embodiment of the invention, the ranges of azimuth about the center covered by the first arc segments of each of the first sensing lines are not overlapped with each other.

In an embodiment of the invention, a number of the first sensing lines is equal to a number of the first arc segments of one single first sensing line.

In an embodiment of the invention, a number of the first sensing lines is smaller than a number of the first arc segments of one single first sensing line.

In an embodiment of the invention, a range of angle covered by the first arc segments of N first sensing lines is $2\pi$, wherein N is a positive integer.

In an embodiment of the invention, the radii of the first arc segments of each of the first sensing lines are in a constant-difference relationship.

In an embodiment of the invention, one of the first arc segments of each of the first sensing lines is intersected with multiple second sensing lines.

In an embodiment of the invention, two adjacent first arc segments of each of the first sensing lines respectively extend clockwise and extend counterclockwise from two ends of the connected first straight segment.

In an embodiment of the invention, of the two adjacent first arc segments, the first arc segment closer to the center extends counterclockwise from the connected first straight segment.

In an embodiment of the invention, a number of the second sensing lines is n, a number of the first sensing lines is i, one of the first arc segments of each of the first sensing lines is intersected with two of the second sensing lines, and the first arc segment farthest away from the center in each of the first sensing lines is the $1^{st}$ first arc segment. One of the first sensing lines is selected as the $1^{st}$ first sensing line, and the first sensing lines are sequentially numbered counterclockwise starting from the $1^{st}$ first sensing line. Of the two second sensing lines intersected with the $1^{st}$ first arc segment of the $1^{st}$ first sensing line, the second sensing line adjacent to an end of the $1^{st}$ first sensing line is used as the $1^{st}$ second sensing line, and the second sensing lines are sequentially numbered counterclockwise starting from the $1^{st}$ second sensing line. If the $k^{th}$ first sensing line is intersected with the $m^{th}$ second sensing line, then polar coordinates of an intersection point are $(r_p, \text{angle } \Theta_m)$, wherein $r_p$ is a radius of the $p^{th}$ first arc segment of the $k^{th}$ first sensing line, p is an integer value of $((m+1)/2)+a-(k-1)n/2i$, and angle $\Theta_m$ is $MOD(2b(m-1)/n+2,2)*\pi$, wherein b is +1, a=0 when m>2(k−1), a=n/2 when m≤2(k−1), $\pi$ is a radian, and k, p, and m are all positive integers.

In an embodiment of the invention, a number of the second sensing lines is n, a number of the first sensing lines is i, one of the first arc segments of each of the first sensing lines is intersected with one of the second sensing lines, and the first arc segment farthest away from the center in each of the first sensing lines is the $1^{st}$ first arc segment. One of the first sensing lines is selected as the $1^{st}$ first sensing line, and the first sensing lines are sequentially numbered counterclockwise starting from the $1^{st}$ first sensing line. The second sensing line intersected with the $1^{st}$ first arc segment of the $1^{st}$ first sensing line is used as the $1^{st}$ second sensing line, and the second sensing lines are sequentially numbered counterclockwise starting from the $1^{st}$ second sensing line. If the $k^{th}$ first sensing line is intersected with the $m^{th}$ second sensing line, then polar coordinates of an intersection point are $(r_p, \text{angle } \Theta_m)$, wherein $r_p$ is a radius of the $p^{th}$ first arc segment of the $k^{th}$ first sensing line, p is an integer value of $m+a-(k-1)n/i$, angle $\Theta_m$ is $2\pi*(m-1)/n$, a=0 when m>2(k−1), a=n when m≤2(k−1), $\pi$ is a radian, and k, p, and m are all positive integers.

In an embodiment of the invention, the first arc segment closer to the center extends clockwise from the connected first straight segment.

In an embodiment of the invention, a number of the second sensing lines is n, a number of the first sensing lines is i, one of the first arc segments of each of the first sensing lines is intersected with two of the second sensing lines, and the first arc segment farthest away from the center in each of the first sensing lines is the $1^{st}$ first arc segment. One of the first sensing lines is selected as the $1^{st}$ first sensing line, and the first sensing lines are sequentially numbered clockwise starting from the $1^{st}$ first sensing line. Of the two second sensing lines intersected with the $1^{st}$ first arc segment of the $1^{st}$ first sensing line, the second sensing line adjacent to an end of the $1^{st}$ first sensing line is used as the $1^{st}$ second sensing line, and the second sensing lines are sequentially numbered clockwise starting from the $1^{st}$ second sensing line. If the $k^{th}$ first sensing line is intersected with the $m^{th}$ second sensing line, then polar coordinates of an intersection point are $(r_p, \text{angle } \Theta_m)$, wherein $r_p$ is a radius of the $p^{th}$ first arc segment of the $k^{th}$ first sensing line, p is an integer value of $((m+1)/2)+a-(k-1)n/2i$, and angle $\Theta_m$ is $\text{MOD}(2b(m-1)/n+2,2)*\pi$, wherein b is $-1$, $a=0$ when $m>2(k-1)$, $a=n/2$ when $m \leq 2(k-1)$, $\pi$ is a radian, and k, p, and m are all positive integers.

In an embodiment of the invention, the first sensing lines and the second sensing lines are disposed on a spherical surface, and a polar axis of the spherical surface passes through the center.

In an embodiment of the invention, among a plurality of intersection points of the first sensing lines and the second sensing lines, part of the intersection points closest to the center are located on a starting latitudinal line, and an included angle between a spherical radius of any one point of the spherical surface on the starting latitudinal line and the polar axis is $\Delta 1$ st degrees. One of the first sensing lines is selected as the $0^{th}$ first sensing line, and the first sensing lines are sequentially numbered in a predetermined direction starting from the $0^{th}$ first sensing line. The second sensing line intersected with the $0^{th}$ first sensing line at the starting latitudinal line is selected as the $0^{th}$ second sensing line, and the second sensing lines are sequentially numbered in the predetermined direction starting from the $0^{th}$ second sensing line. If a longitude of the $0^{th}$ second sensing line is set as $0°$, then a longitude coordinate of the intersection point between the $m^{th}$ first sensing line and the $n^{th}$ second sensing line is $n*2\pi/Q$, and a latitude coordinate is $\text{MOD}(((n-m)+Q)/Q,1)*\pi+\Delta 1$ st, wherein a number of the first sensing lines is $M+1$, a number of the second sensing lines is $N+1$, $\pi$ is a radian, m is 0 to M, n is 0 to N, and Q is $M+1$ or $N+1$.

In an embodiment of the invention, the predetermined direction is a clockwise direction or a counterclockwise direction.

In an embodiment of the invention, each of the second sensing lines includes a plurality of second straight segments and a plurality of second arc segments. Each of the second arc segments is connected between two adjacent second straight segments. Different second arc segments have different radii about the center. The second straight segments are intersected with the first arc segments of the first sensing lines. The second arc segments are intersected with the first straight segments of the first sensing lines.

In an embodiment of the invention, the second arc segments of each of the second sensing lines cover different ranges of angle.

In an embodiment of the invention, a number of the first sensing lines is identical to a number of the second sensing lines.

In an embodiment of the invention, a number of the second straight segments is inconsistent among the second sensing lines.

In an embodiment of the invention, a number of the first arc segments is inconsistent among the first sensing lines.

In an embodiment of the invention, the second sensing lines extend radially outward in straight lines from the center.

In an embodiment of the invention, the second sensing lines are a plurality of annular sensing lines concentrically arranged around the center, and the second sensing lines are intersected with the first straight segments of the first sensing lines.

Accordingly, each of the first sensing lines of the touch panel of the embodiments of the invention includes a plurality of first arc segments and a plurality of first straight segments. Each of the first straight segments is connected between two adjacent first arc segments, and different first arc segments have different radii about a center. Therefore, each of the first sensing lines of the touch panel of the embodiments of the invention can extend to a periphery of the touch panel through the first arc segments and the first straight segments connected to each other, such that each of the first sensing lines can be directly led out from the panel periphery, and it is not necessary to reserve a space for leads in the panel. Accordingly, in the touch panel of the embodiments of the invention, the sensing lines can be distributed in all ranges of azimuth to achieve comprehensive touch functions.

To provide a further understanding of the aforementioned and other features and advantages of the disclosure, exemplary embodiments, together with the reference drawings, are described in detail below.

DESCRIPTION OF THE EMBODIMENTS

Figure 1:
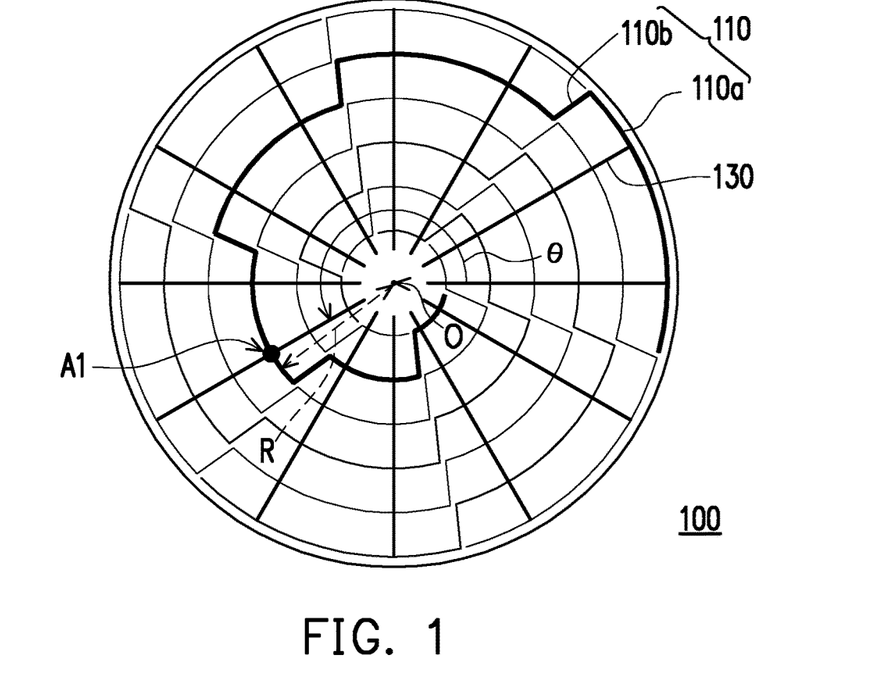
FIG. 1 is a top-view schematic diagram illustrating a touch panel according to an embodiment of the invention.

FIG. 1 is a top-view schematic diagram illustrating a touch panel according to an embodiment of the invention. For clarity, FIG. 1 and subsequent figures merely schematically illustrate sensing lines inside main sensing regions of the touch panel. However, the touch panel described herein may further include other components unillustrated in the drawings such as peripheral wirings and driving circuits (or touch control circuits) located at a periphery. Referring to FIG. 1, a touch panel 100 includes a plurality of first sensing lines 110 extending outward in a stepped manner from inside the touch panel 100 to a periphery of the touch panel 100, and a plurality of second sensing lines 130 extending along a radial direction (i.e., a radius direction with a center O as the circle center). Here, the center O is shown in the drawings merely for purposes of illustration, and the center O is not necessarily visibly present in actual products of the touch panel 100. In other words, the center O may be a virtual point rather than a physical point or pattern.

The first sensing lines 110 are separated from each other. Each of the first sensing lines 110 includes a plurality of first arc segments 110a extending along a circumferential direction (i.e., a circumferential direction with the center O as the circle center) and a plurality of first straight segments 110b extending along the radial direction. Each of the first straight segments 110b is connected between two adjacent first arc segments 110a. Different first arc segments 110a have different radii about the center O. The radii of the first arc segments 110a are in a constant-difference relationship, and different first arc segments 110a cover ranges of azimuth about the center O that are different and are not overlapped with each other. For example, the range of azimuth covered by the first arc segment 110a farthest away from the center O is, for example, 0° to 60°, and the range of azimuth covered by the first arc segment 110a second farthest away from the center O is, for example, 60° to 120°, and so on. However, the invention is not limited hereto.

The second sensing lines 130 extend radially outward in straight lines from the center O, are separated from each other, and are intersected with the first sensing lines 110. Moreover, one of the first arc segments 110a of each of the first sensing lines 110 is intersected with multiple second sensing lines 130 (FIG. 1 illustrates an example where one of the first arc segments 110a of each of the first sensing lines 110 is intersected with two of the second sensing lines 130).

Specifically, two adjacent first arc segments 110a of each of the first sensing lines 110 respectively extend clockwise and extend counterclockwise from two ends of the connected first straight segment 110b. According to FIG. 1, of the two adjacent first arc segments 110a, the first arc segment 110a that is closer to the center O extends counterclockwise from the connected first straight segment 110b, and of the two adjacent first arc segments 110a, the first arc segment 110a that is farther away from the center O extends clockwise from the connected first straight segment 110b.

It is noted that the arc segments and the straight segments mentioned here are defined by projected shapes shown on a view plan to which the sensing line segments located on the touch panel 100 are projected with the center O as the center point. In other words, when the projected shape shown on the view plan to which the sensing line segment is projected with the center O as the center point is an arc shape, this sensing line segment is defined as an arc segment. When the projected shape shown on the view plan to which the sensing line segment is projected with the center O as the center point is a straight line shape, this sensing line segment is defined as a straight segment. Therefore, on a non-planar touch panel (e.g., a spherical touch panel), even if the sensing line segment on the touch panel is actually not a straight line shape, as long as the projected shape shown on the view plan to which the sensing line segment is projected with the center O as the center point is a straight line shape, this sensing line segment may be defined as a straight segment.

In the present embodiment, all of the first arc segments 110a of one single first sensing line 110 may cover the range of 360 degrees. Therefore, when one single first sensing line 110 has i first arc segments 110a, each of the first arc segments 110a may cover a radian range of 360/i degrees, wherein i is a positive integer. Moreover, to allow the first arc segments 110a having the same radius to cover the range of 360 degrees, the touch panel 100 may include i first sensing lines 110. In other words, in the present embodiment, the number of the first sensing lines 110 is equal to the number of all of the first arc segments 110a of one single first sensing line 110. Accordingly, the touch panel 100 can provide touch sensing functions at all 360 degrees.

The intersection between the first sensing line 110 and the second sensing line 130 may define a touch sensing point (e.g., an intersection point A1 in FIG. 1), and the touch sensing points may all provide effective touch sensing functions. In the present embodiment, any one of the first sensing lines 110 and any one of the second sensing lines 130 are intersected at most at one touch sensing point to prevent failure in accurately determining the touch position. Moreover, all of the first arc segments 110a of one single first sensing line 110 may cover the range of 360 degrees. Therefore, any one of the first sensing lines 110 is intersected with all of the second sensing lines 130 each at one touch sensing point. For example, when the number of the second sensing lines 130 is n, any one of the first sensing lines 110 may be intersected with all of the n second sensing lines 130 to define n touch sensing points.

A sensing method of the touch panel 100 may include inputting a driving signal to one of the first sensing lines 110 one after another, and simultaneously reading sensing signals of all of the second sensing lines 130 when the driving signal is inputted to each of the first sensing lines 110. Alternatively, the sensing method may include inputting a driving signal to one of the second sensing lines 130 one after another, and simultaneously reading sensing signals of all of the first sensing lines 110 when the driving signal is inputted to each of the second sensing lines 130.

In the present embodiment, the number of the second sensing lines 130 is n, the number of the first sensing lines 110 is i, n may be two times i, and the number of all of the first arc segments 110a of one single first sensing line 110 is equal to the number of all of the first sensing lines 110. Therefore, each of the first arc segments 110a of each of the first sensing lines 110 is intersected with two second sensing lines 130, but the invention is not limited hereto. In other embodiments, n may be equal to i or n may be in another relationship with i. When positions of the touch sensing points are calculated, the first arc segment 110a farthest away from the center O in each of the first sensing lines 110 may be defined as the $1^{st}$ first arc segment 110a. Moreover, one of the first sensing lines 110 is selected as the $1^{st}$ first sensing line 110, and the first sensing lines 110 are sequentially numbered counterclockwise starting from the $1^{st}$ first sensing line 110. Meanwhile, of the two second sensing lines 130 intersected with the $1^{st}$ first arc segment 110a of the $1^{st}$ first sensing line 110, the second sensing line 130 adjacent to an end of the $1^{st}$ first sensing line 110 is used as the $1^{st}$ second sensing line 130, and the second sensing lines 130 are sequentially numbered counterclockwise starting from the $1^{st}$ second sensing line 130. Accordingly, polar coordinates of the intersection point A1 of the $k^{th}$ first sensing line 110 and the $m^{th}$ second sensing line 130 are $(r_p, \Theta_m)$, wherein $r_p$ is a radius R of the $p^{th}$ first arc segment 110a of the $k^{th}$ first sensing line 110, and $\Theta_m$ is an angle $\Theta$ between the $1^{st}$ second sensing line 130 and the $m^{th}$ second sensing line 130 measured in a counterclockwise direction. p is an integer value of $((m+1)/2)+a-(k-1)n/2i$, and $\Theta_m$ is $MOD(2b(m-1)/n+2,2)*\pi$, wherein b is +1, a=0 when m>2(k-1), a=n/2 when m≤2(k-1), $\pi$ is a radian, and the symbols k, p, and m are all positive integers. Here, the symbol k is used to represent an order of a first sensing line 110 among all of the first sensing lines 110, and the symbol m is used to represent an order of a second sensing line 130 among all of the second sensing lines 130.

For example, in the example of FIG. 1, it is known that n=12 and i=6. If the first sensing line 110 rendered in a thicker line in FIG. 1 is used as the 1$^{st}$ first sensing line 110, then, of the two second sensing lines 130 intersected with the 1$^{st}$ first arc segment 110a of the 1$^{st}$ first sensing line 110, the second sensing line 130 adjacent to the end of the 1$^{st}$ first sensing line 110 is used as the 1$^{st}$ second sensing line 130, and the first sensing lines 110 and the second sensing lines 130 are respectively sequentially numbered counterclockwise starting from the 1$^{st}$ first sensing line 110 and the 1$^{st}$ second sensing line 130. In this case, the polar coordinates of the intersection point A1 at which the $(k=1)^{th}$ first sensing line 110 and the $(m=8)^{th}$ second sensing line 130 are intersected as shown in FIG. 1 are $(r4, 7\pi/6)$. The touch panel 100 can obtain the correct position information simply based on the radius of the 4$^{th}$ first arc segment 110a assigned at the time of design. However, the embodiments of the invention are not limited hereto. In other embodiments, the touch panel 100 may store the position information of all of the intersection points of the first sensing lines 110 and the second sensing lines 130 in a table and obtain the corresponding position information by looking up the table when the sensing signal is read.

Figure 2:
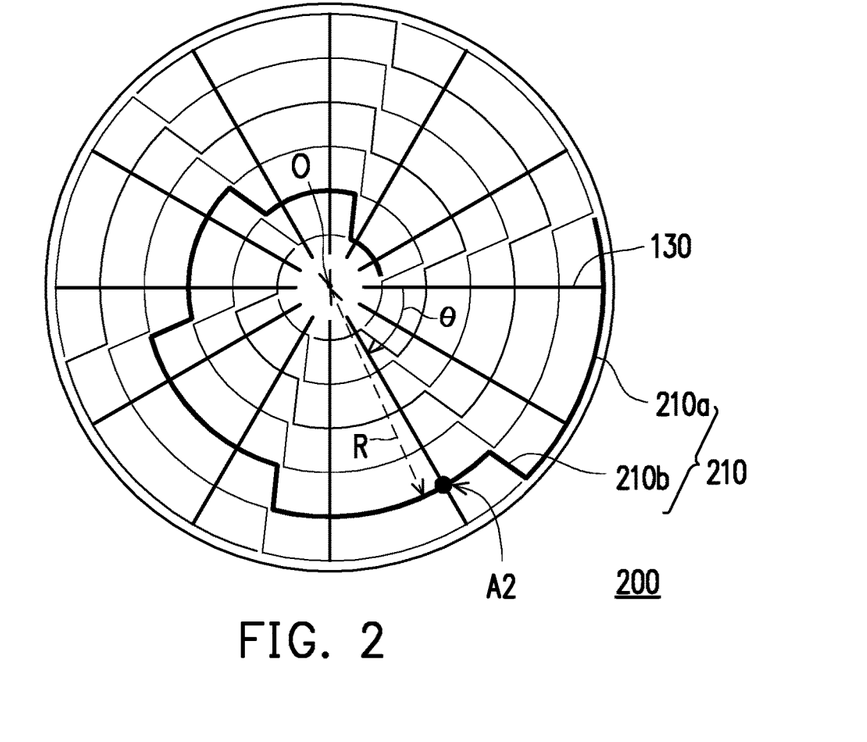
FIG. 2 is a top-view schematic diagram illustrating a touch panel according to an embodiment of the invention.

FIG. 2 is a top-view schematic diagram illustrating a touch panel according to an embodiment of the invention. Referring to FIG. 2, a touch panel 200 is largely identical to the touch panel 100 of FIG. 1, and the main difference lies in that, of two adjacent first arc segments 210a of the touch panel 200, the first arc segment 210a that is closer to the center O extends clockwise from a connected first straight segment 210b, and of the two adjacent first arc segments 210a, the first arc segment 210a that is farther away from the center O extends counterclockwise from the connected first straight segment 210b. In other words, the first sensing line 110 of the touch panel 100 extends clockwise outward in a stepped manner from inside the touch panel 100 to the periphery of the touch panel 100, while a first sensing line 210 of the touch panel 200 extends counterclockwise outward in a stepped manner from inside the touch panel 200 to a periphery of the touch panel 200.

In the present embodiment, the number of the second sensing lines 130 is n, the number of the first sensing lines 210 is i, n may be two times i, and the number of all of the first arc segments 210a of one single first sensing line 210 is equal to the number of all of the first sensing lines 210. Therefore, each of the first arc segments 210a of each of the first sensing lines 210 is intersected with two second sensing lines 130, but the invention is not limited hereto. In other embodiments, n may be equal to i or n may be in another relationship with i. When positions of the touch sensing points are calculated, the first arc segment 210a farthest away from the center O in each of the first sensing lines 210 may be defined as the 1$^{st}$ first arc segment 210a. Moreover, one of the first sensing lines 210 is selected as the 1$^{st}$ first sensing line 210, and the first sensing lines 210 are sequentially numbered clockwise starting from the 1$^{st}$ first sensing line 210. Meanwhile, of the two second sensing lines 130 intersected with the 1$^{st}$ first arc segment 210a of the 1$^{st}$ first sensing line 210, the second sensing line 130 adjacent to an end of the 1$^{st}$ first sensing line 210 is used as the 1$^{st}$ second sensing line 130, and the second sensing lines 130 are sequentially numbered clockwise starting from the 1$^{st}$ second sensing line 130. Accordingly, polar coordinates of an intersection point A2 of the k$^{th}$ first sensing line 210 and the m$^{th}$ second sensing line 130 are $(r_p, \Theta_m)$, wherein $r_p$ is a radius R of the p$^{th}$ first arc segment 210a of the k$^{th}$ first sensing line 210, and $\Theta_m$ is an angle $\Theta$ between the 1$^{st}$ second sensing line 130 and the m$^{th}$ second sensing line 130 measured in a counterclockwise direction. p is an integer value of $((m+1)/2)+a-(k-1)n/2i$, and $\Theta_m$ is $MOD(2b(m-1)/n+2,2)*\pi$, wherein b is −1, a=0 when m>2(k−1), a=n/2 when m≤2(k−1), $\pi$ is a radian, and the symbols k, p, and m are all positive integers. Here, the symbol k is used to represent an order of a first sensing line 210 among all of the first sensing lines 210, and the symbol m is used to represent an order of a second sensing line 130 among all of the second sensing lines 130.

For example, in the example of FIG. 2, it is known that n=12 and i=6. If the first sensing line 210 rendered in a thicker line in FIG. 2 is used as the 1$^{st}$ first sensing line 210, then, of the two second sensing lines 130 intersected with the 1$^{st}$ first arc segment 210a of the 1$^{st}$ first sensing line 210, the second sensing line 130 adjacent to the end of the 1$^{st}$ first sensing line 210 is used as the 1$^{st}$ second sensing line 130, and the first sensing lines 210 and the second sensing lines 130 are respectively sequentially numbered clockwise starting from the 1$^{st}$ first sensing line 210 and the 1$^{st}$ second sensing line 130. In this case, the polar coordinates of the intersection point A2 at which the $(k=1)^{th}$ first sensing line 210 and the $(m=3)^{th}$ second sensing line 130 are intersected as shown in FIG. 2 are $(r2, -\pi/3)$.

Figure 3:
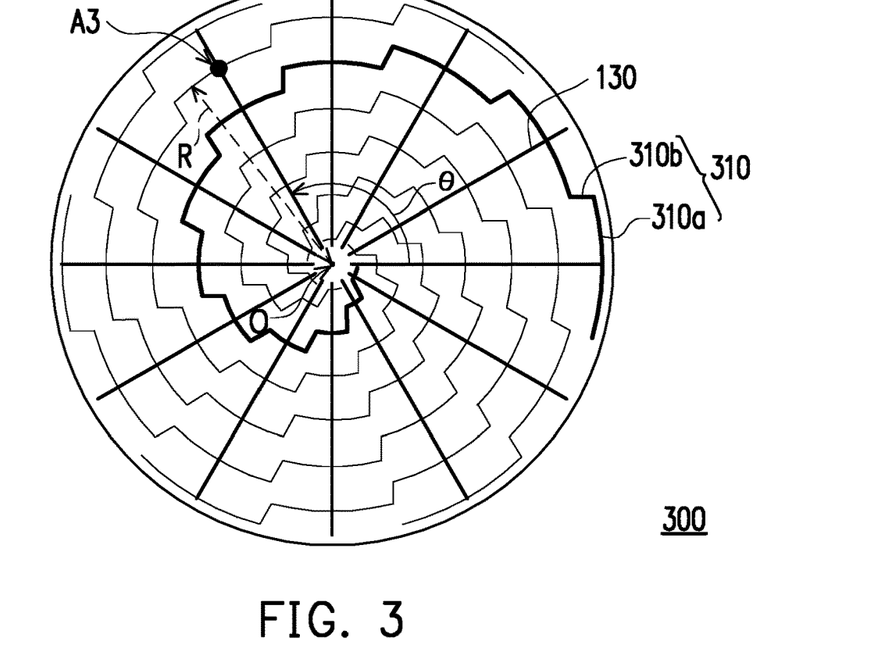
FIG. 3 is a top-view schematic diagram illustrating a touch panel according to an embodiment of the invention.

FIG. 3 is a top-view schematic diagram illustrating a touch panel according to an embodiment of the invention. Referring to FIG. 3, a touch panel 300 is largely identical to the touch panel 100 of FIG. 1, and the main difference lies in that, each first arc segment 310a of each first sensing line 310 in the touch panel 300 is intersected with one second sensing line 130, and the number of the first sensing lines 310 is smaller than the number of all of the first arc segments 310a (or all first straight segments 310b) of one single first sensing line 310.

In the present embodiment, the touch panel 300 includes a plurality of first sensing lines 310 extending outward in a stepped manner from inside the touch panel 300 to a periphery of the touch panel 300, and a plurality of second sensing lines 130 extending along a radial direction. Each of the first sensing lines 310 includes a plurality of first arc segments 310a extending along a circumferential direction and a plurality of first straight segments 310b extending along the radial direction. In the present embodiment, it is possible that two adjacent first arc segments 310a of the touch panel 300 having the same radius do not cover continuous ranges of angle, and the ranges covered by all of the first arc segments 310a having the same radius may be less than 360 degrees. Specifically, the touch panel 300 may include i first sensing lines 310, one single first sensing line 310 may include 2i first arc segments 310a, and all of the first arc segments 310a of one single first sensing line 310 may cover the range of 360 degrees. Therefore, each of the first arc segments 310a may cover a radian range of 360/2i degrees, wherein i is a positive integer. Accordingly, the range covered by the i first arc segments 310a on the same radius is 180 degrees and is less than 360 degrees. Moreover, the i first arc segments 310a on the same radius may be spaced apart from each other by 360/2i degrees, but the invention is not limited hereto. In other embodiment, the number of the first arc segments 310a of one single first sensing line 310 may be in another relationship with the number of all of the first sensing lines 310, such that all of the first arc segments 310a having the same radius cover other ranges of angle.

In the present embodiment, the number of the second sensing lines 130 is n, the number of the first sensing lines 310 is i, n may be two times i, and the number of all of the first arc segments 310a of one single first sensing line 310 is two times the number of all of the first sensing lines 310. Therefore, one of the first arc segments 310a of each of the first sensing lines 310 is intersected with one second sensing line 130, but the invention is not limited hereto. In other embodiments, n may be equal to i or n may be in another relationship with i. When the positions of the touch sensing points are calculated, the first arc segment 310a farthest away from the center O in each of the first sensing lines 310 may be defined as the $1^{st}$ first arc segment 310a. Moreover, one of the first sensing lines 310 is selected as the $1^{st}$ first sensing line 310, and the first sensing lines 310 are sequentially numbered counterclockwise starting from the $1^{st}$ first sensing line 310. Meanwhile, the second sensing line 130 intersected with the $1^{st}$ first arc segment 310a of the $1^{st}$ first sensing line 310 is used as the $1^{st}$ second sensing line 130, and the second sensing lines 130 are sequentially numbered counterclockwise starting from the $1^{st}$ second sensing line 130. Accordingly, polar coordinates of an intersection point A3 of the $k^{th}$ first sensing line 310 and the $m^{th}$ second sensing line 130 are $(r_p, \Theta_m)$, wherein $r_p$ is a radius R of the $p^{th}$ first arc segment 310a of the $k^{th}$ first sensing line 310, and $\Theta_m$ is an angle θ between the $1^{st}$ second sensing line 130 and the $m^{th}$ second sensing line 130 measured in a counterclockwise direction. p is an integer value of m+a−(k−1)n/i, the angle $\Theta_m$ is 2π*(m−1)/n, a=0 when m>2(k−1), a=n when m≤2(k−1), π is a radian, and the symbols k, p, and m are all positive integers. Here, the symbol k is used to represent an order of a first sensing line 310 among all of the first sensing lines 310, and the symbol m is used to represent an order of a second sensing line 130 among all of the second sensing lines 130.

For example, in the example of FIG. 3, it is known that n=12 and i=6. If the first sensing line 310 rendered in a thicker line in FIG. 3 is used as the $1^{st}$ first sensing line 310, then the second sensing line 130 intersected with the $1^{st}$ first arc segment 310a of the $1^{st}$ first sensing line 310 is used as the $1^{st}$ second sensing line 130, and the first sensing lines 310 and the second sensing lines 130 are respectively sequentially numbered counterclockwise starting from the $1^{st}$ first sensing line 310 and the $1^{st}$ second sensing line 130. In this case, the polar coordinates of the intersection point A3 at which the $(k=2)^{th}$ first sensing line 310 and the $(m=5)^{th}$ second sensing line 130 are intersected as shown in FIG. 3 are (r3, 2π/3).

Figure 4:
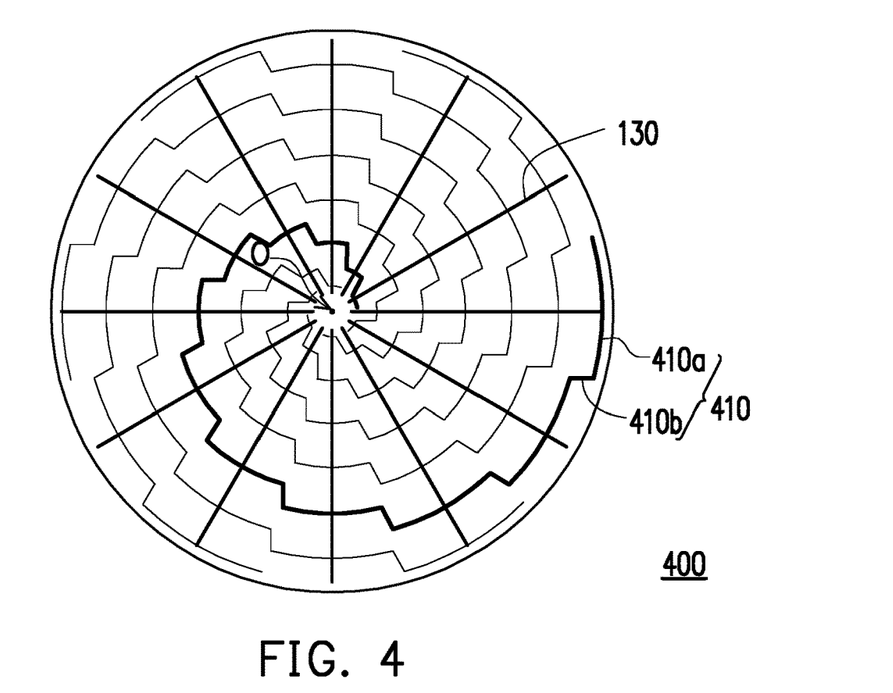
FIG. 4 is a top-view schematic diagram illustrating a touch panel according to an embodiment of the invention.

FIG. 4 is a top-view schematic diagram illustrating a touch panel according to an embodiment of the invention. Referring to FIG. 4, a touch panel 400 is largely identical to the touch panel 300 of FIG. 3, and the main difference lies in that, of two adjacent first arc segments 410a of the touch panel 400, the first arc segment 410a that is closer to the center O extends clockwise from a connected first straight segment 410b, and of the two adjacent first arc segments 410a, the first arc segment 410a that is farther away from the center O extends counterclockwise from the connected first straight segment 410b. In other words, the first sensing line 310 of the touch panel 300 extends clockwise outward in a stepped manner from inside the touch panel 300 to the periphery of the touch panel 300, while a first sensing line 410 of the touch panel 400 extends counterclockwise outward in a stepped manner from inside the touch panel 400 to a periphery of the touch panel 400.

Figure 5A:
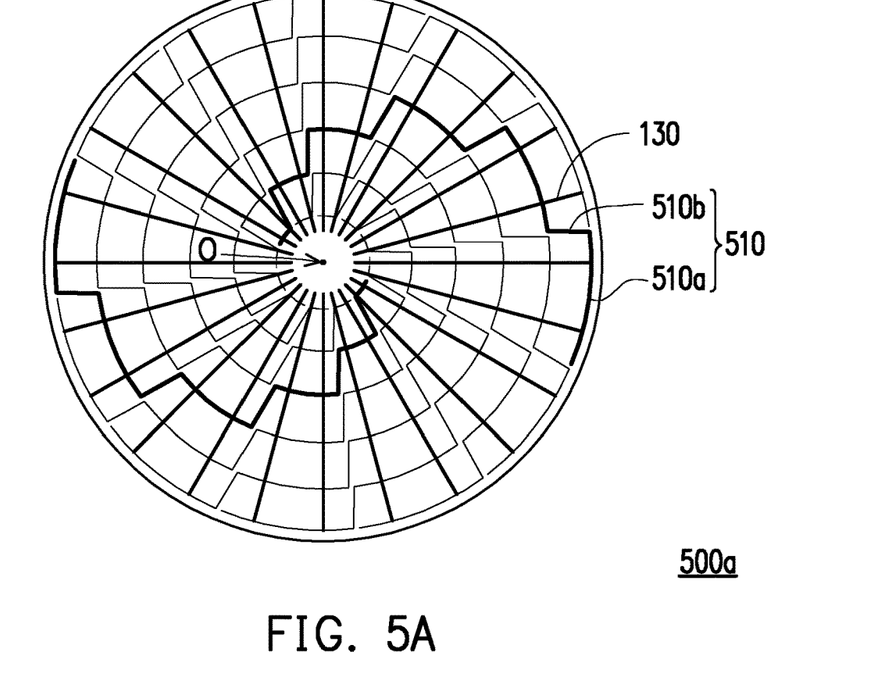
FIG. 5A is a top-view schematic diagram illustrating a touch panel according to an embodiment of the invention.
Figure 5B:
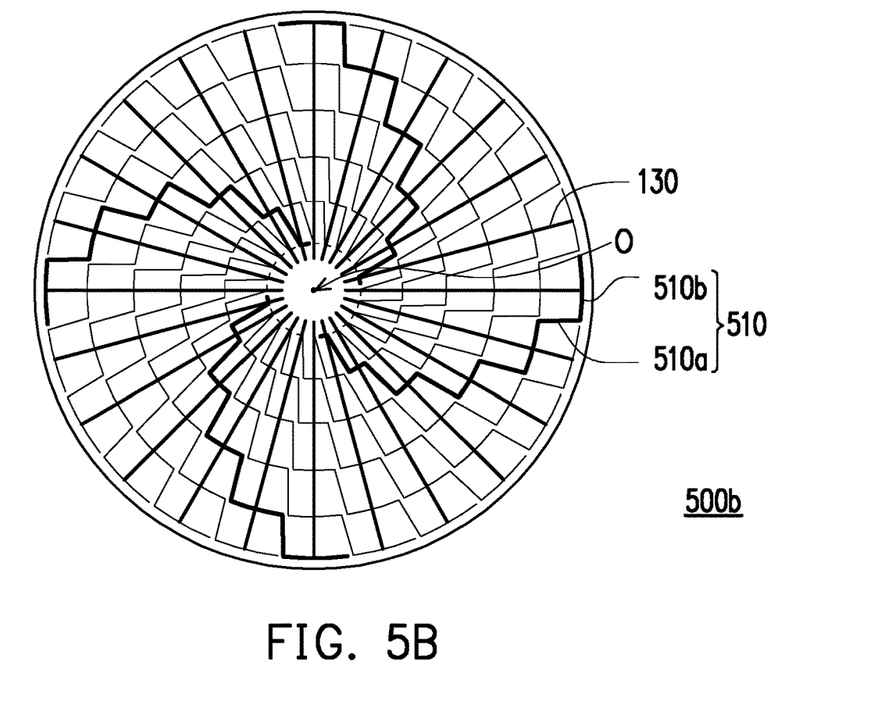
FIG. 5B is a top-view schematic diagram illustrating a touch panel according to another embodiment of the invention.

FIG. 5A is a top-view schematic diagram illustrating a touch panel according to an embodiment of the invention. FIG. 5B is a top-view schematic diagram illustrating a touch panel according to another embodiment of the invention. Referring to FIG. 5A and FIG. 5B, a touch panel 500a and a touch panel 500b are largely identical to the touch panel 100 of FIG. 1, and the main difference lies in that, the range of angle covered by all of the first arc segments 110a of any one of the first sensing lines 110 of the touch panel 100 is 2π, while the range of angle covered by all first arc segments 510a of N first sensing lines 510 of the touch panel 500a and the touch panel 500b is 2π, and N is a positive integer. In other words, in the touch panel 500a and the touch panel 500b, the range of angle covered by all of the first arc segments 510a of one single first sensing line 510 is 2π/N.

Specifically, N of the touch panel 500a and the touch panel 500b is respectively 2 and 4. As shown in FIG. 5A, in the touch panel 500a, the range of angle covered by all of the first arc segments 510a of the two first sensing lines 510 rendered in thicker lines is 2π. As shown in FIG. 5B, in the touch panel 500b, the range of angle covered by all of the first arc segments 510a of the four first sensing lines 510 rendered in thicker lines is 2π. In FIG. 5A, all of the first arc segments 510a of the two first sensing lines 510 rendered in thicker lines are each intersected with a portion of the second sensing lines 130, and the two first sensing lines 510 are not intersected with the same one second sensing line 130 at the same time. Similarly, in FIG. 5B, all of the first arc segments 510a of the four first sensing lines 510 rendered in thicker lines are each intersected with a portion of the second sensing lines 130, and the four first sensing lines 510 are not intersected with the same one second sensing line 130 at the same time. Therefore, the touch panel 500a and the touch panel 500b of the present embodiment may input a driving signal simultaneously to multiple first sensing lines 510. For example, a driving signal may be inputted simultaneously to the two first sensing lines 510 rendered in thicker lines in FIG. 5A, and a driving signal may be inputted simultaneously to two, three, or all of the four first sensing lines 510 rendered in thicker lines in FIG. 5B. Accordingly, the touch panel 500a and the touch panel 500b exhibit a higher refresh rate and computation speed. For example, when the number of the first sensing lines 510 is n, it only takes n/N times of driving signal inputs to complete scanning of all of the first sensing lines 510.

In the present embodiment, as shown in FIG. 5A, of two adjacent first arc segments 510a, the first arc segment 510a that is closer to the center O may extend counterclockwise from a connected first straight segment 510b, and of the two adjacent first arc segments 510a, the first arc segment 510a that is farther away from the center O may extend clockwise from the connected first straight segment 510b. As shown in FIG. 5B, of two adjacent first arc segments 510a, the first arc segment 510a that is closer to the center O may also extend clockwise from a connected first straight segment 510b, and of the two adjacent first arc segments 510a, the first arc segment 510a that is farther away from the center O may also extend counterclockwise from the connected first straight segment 510b.

Figure 6:
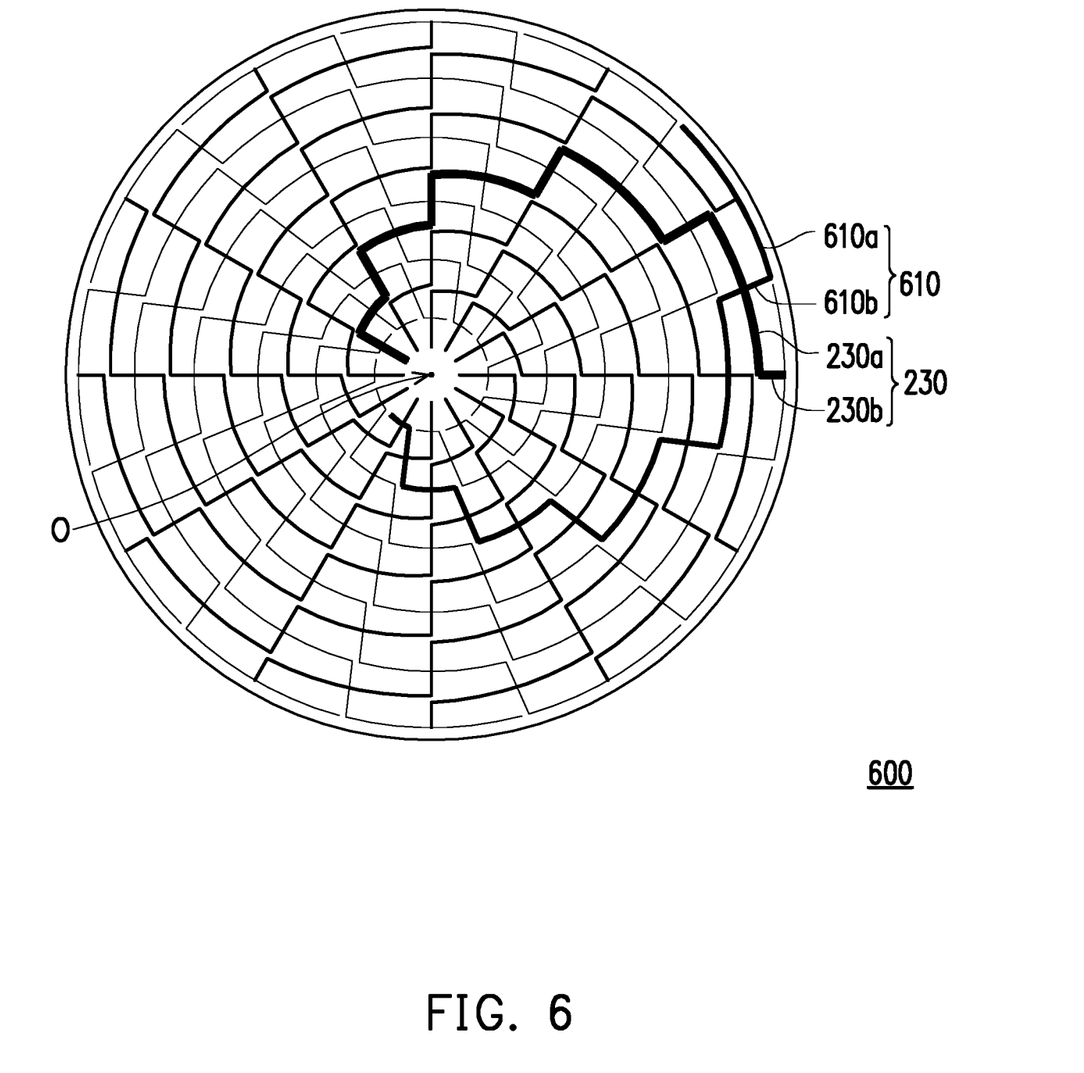
FIG. 6 is a top-view schematic diagram illustrating a touch panel according to an embodiment of the invention.

FIG. 6 is a top-view schematic diagram illustrating a touch panel according to an embodiment of the invention. Referring to FIG. 6, a touch panel 600 includes a plurality of first sensing lines 610 and a plurality of second sensing lines 230. The first sensing lines 610 are separated from each other. Each of the first sensing lines 610 includes a plurality of first arc segments 610a extending along a circumferential direction and a plurality of first straight segments 610b extending along a radial direction. Each of the first straight segments 610b is connected between two adjacent first arc segments 610a. Different first arc segments 610a have different radii about the center O, and different first arc segments 610a cover different ranges of azimuth about the center O. Specifically, of two adjacent first arc segments 610a, the first arc segment 610a that is closer to the center O extends clockwise from the connected first straight segment 610b, and of the two adjacent first arc segments 610a, the first arc segment 610a that is farther away from the center O extends counterclockwise from the connected first straight segment 610b. Moreover, each of the second sensing lines 230 includes a plurality of second straight segments 230b extending along the radial direction and a plurality of second arc segments 230a extending along the circumferential direction. Each of the second arc segments 230a is connected between two adjacent second straight segments 230b. Different second arc segments 230a have different radii about the center O, and the second arc segments 230a of each of the second sensing lines 230 cover different ranges of angle. Specifically, of two adjacent second arc segments 230a, the second arc segment 230a that is closer to the center O extends counterclockwise from the connected second straight segment 230b, and of the two adjacent second arc segments 230a, the second arc segment 230a that is farther away from the center O extends clockwise from the connected second straight segment 230b.

In the present embodiment, the number of the first sensing lines 610 and the number of the second sensing lines 230 are identical. The second straight segments 230b are intersected with the first arc segments 610a of the first sensing lines 610, and the second arc segments 230a are intersected with the first straight segments 610b of the first sensing lines 610. The main difference between the touch panel 600 and the foregoing embodiments lies in that the second sensing lines 230 of the touch panel 600 are not straight line shapes extending along the radial direction but include the second arc segments 230a and the second straight segments 230b similar to the first arc segments 610a and the first straight segments 610b of the first sensing lines 610. Moreover, the second sensing lines 230 extend outward in a stepped manner from inside the touch panel 600 to a periphery of the touch panel 600 in a rotation direction opposite to the direction of the first sensing lines 610.

Figure 7:
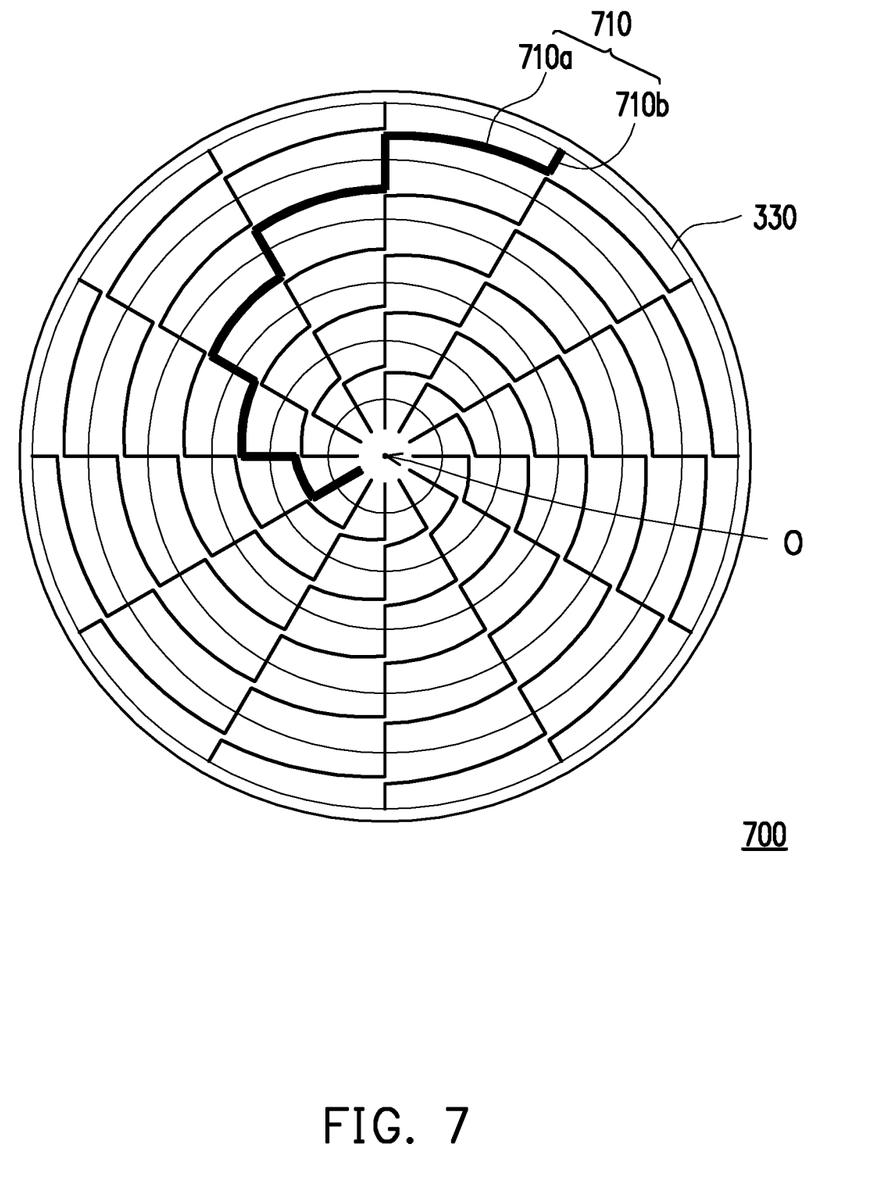
FIG. 7 is a top-view schematic diagram illustrating a touch panel according to an embodiment of the invention.

FIG. 7 is a top-view schematic diagram illustrating a touch panel according to an embodiment of the invention. Referring to FIG. 7, configurations of first arc segments 710a and first straight segments 710b of first sensing lines 710 of a touch panel 700 are similar to those of the second arc segments 230a and the second straight segments 230b of the second sensing lines 230 of the touch panel 600 of FIG. 6. The main difference between the touch panel 700 and the touch panel 600 lies in that second sensing lines 330 of the touch panel 700 are a plurality of annular sensing lines concentrically arranged around the center O, and different second sensing lines 710 have different radii about the center O. The second sensing lines 330 are intersected with the first straight segments 710b of the first sensing lines 710.

Figure 8A:
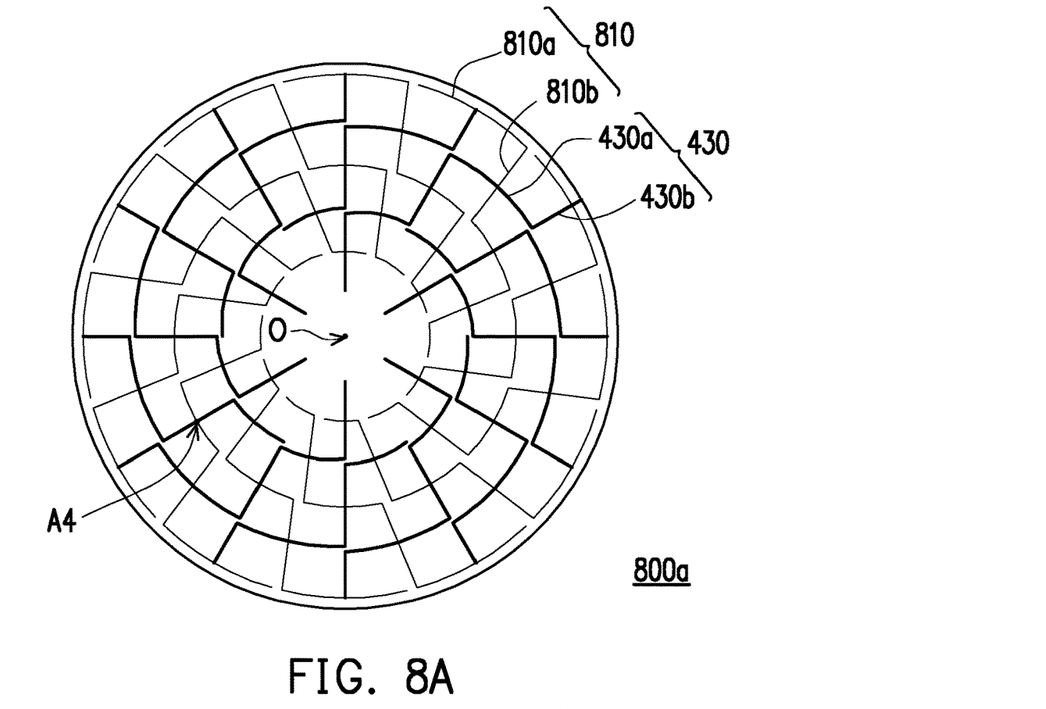
FIG. 8A is a top-view schematic diagram illustrating a touch panel according to an embodiment of the invention.
Figure 8B:
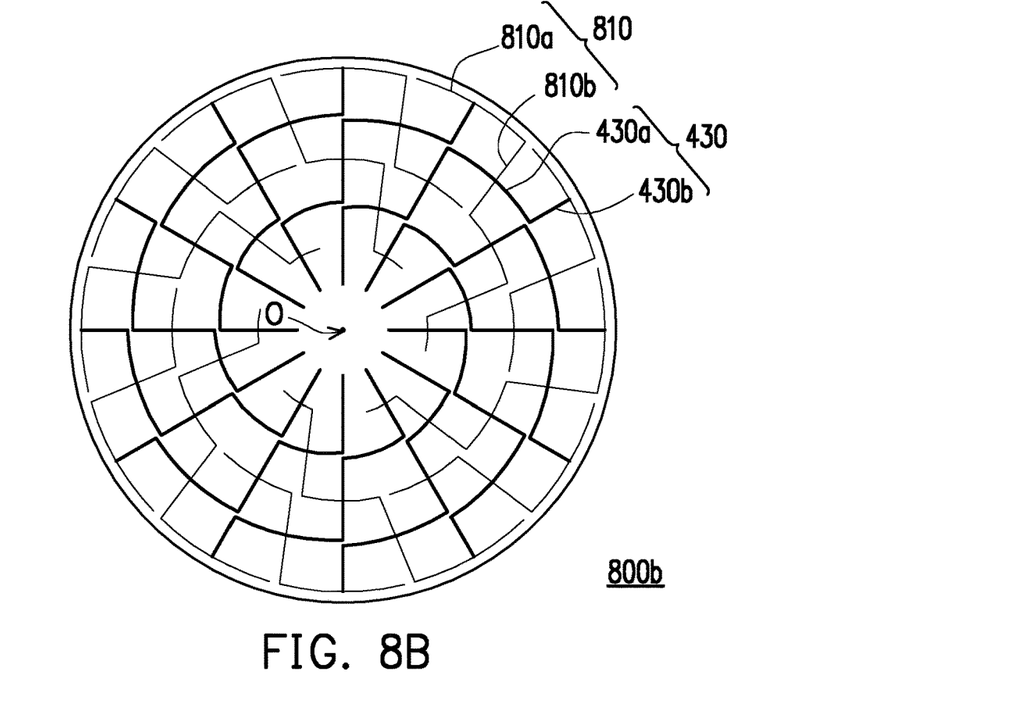
FIG. 8B is a top-view schematic diagram illustrating a touch panel according to another embodiment of the invention.

FIG. 8A is a top-view schematic diagram illustrating a touch panel according to an embodiment of the invention. FIG. 8B is a top-view schematic diagram illustrating a touch panel according to another embodiment of the invention. Referring to FIG. 8A and FIG. 8B, a touch sensing point (e.g., an intersection point A4 in FIG. 8A) may be defined at an intersection between a first arc segment 810a of a first sensing line 810 and a second straight segment 430b of a second sensing line 430. According to FIG. 8A and FIG. 8B, a density of the touch sensing points close to the center O is higher than a density of the touch sensing points away from the center O. To uniformize distribution of the density of the touch sensing points of a touch panel 800a and a touch panel 800b, the number of the touch sensing points close to the center O may be decreased. In other words, it is possible that part of the second sensing lines 430 are not configured with the second straight segments 430b close to the center O, or part of the first sensing lines 810 are not configured with the first arc segments 810a close to the center O.

Specifically, as shown in FIG. 8A, at one end close to the center O, part of the second sensing lines 430 of the touch panel 800a do not include the second straight segments 430b connected to second arc segments 430a. Therefore, the number of the second straight segments 430b is inconsistent among different second sensing lines 430 of the touch panel 800a, and it is possible that part of the first arc segments 810a closest to the center O are not intersected with any second straight segments 430b. As shown in FIG. 8B, at one end close to the center O, part of the first sensing lines 810 of the touch panel 800b do not include one first straight segment 810b connected to the first arc segment 810a and one first arc segment 810a connected to it. Therefore, the number of the first arc segments 810a and the number of the first straight segments 810b are inconsistent among different first sensing lines 810 of the touch panel 800b. For example, in FIG. 8B, of two adjacent first sensing lines 810, one includes three first arc segments 810a and two first straight segment 810b, and the other one includes two first arc segments 810a and one first straight segment 810b. In this case, it is possible that part of the second straight segments 430b closest to the center O are not intersected with any first arc segments 810a.

Figure 9:
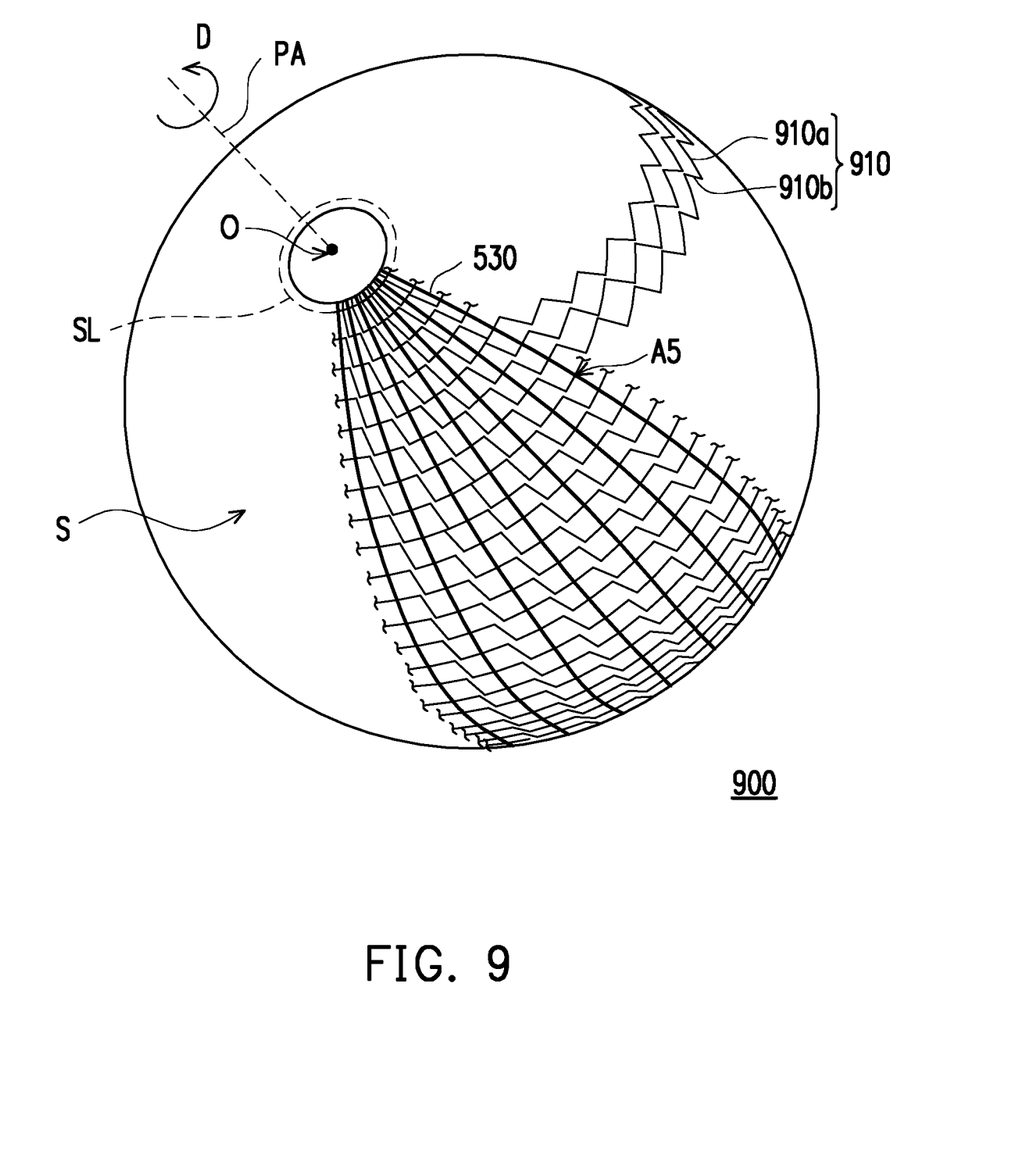
FIG. 9 is a schematic diagram illustrating a touch panel according to an embodiment of the invention.

FIG. 9 is a schematic diagram illustrating a touch panel according to an embodiment of the invention. For clarity of illustration, FIG. 9 merely illustrates part of the first sensing lines and second sensing lines for description. Referring to FIG. 9, a touch panel 900 includes a spherical surface S, and a polar axis PA of the spherical surface S passes through a center O. First sensing lines 910 and second sensing lines 530 of the touch panel 900 are disposed on the spherical surface S. Each of the first sensing lines 910 includes a plurality of first arc segments 910a extending along a direction of latitudinal lines (i.e., lines where planes perpendicular to the polar axis PA are intersected with the spherical surface S) and a plurality of first straight segments 910b extending along a direction of longitudinal lines (i.e., lines where planes parallel to the polar axis PA and passing through the polar axis PA are intersected with the spherical surface S). Each of the first straight segments 910b is connected between two adjacent first arc segments 910a. Different first arc segments 910a have different radii about the center O (or the polar axis PA). The radii of the first arc segments 910a are in a constant-difference relationship, and different first arc segments 910a cover ranges of azimuth about the center O that are different and are not overlapped with each other. The second sensing lines 530 extend along the direction of longitudinal lines, are separated from each other, and are intersected with the first sensing lines 910. In the present embodiment, one of the first arc segments 910a of each of the first sensing lines 910 is intersected with one of the second sensing lines 530. In other embodiments (not illustrated), one of the first arc segments 910a of each of the first sensing lines 910 may also be intersected with multiple second sensing lines 530.

In the present embodiment, among a plurality of intersection points of the first sensing lines 910 and the second sensing lines 530, part of the intersection points closest to the center O are located on a starting latitudinal line SL, and an included angle between a spherical radius of any one point of the spherical surface S on the starting latitudinal line SL and the polar axis PA is Δ1st degrees. One of the first sensing lines 910 is selected as the $0^{th}$ first sensing line 910, and the first sensing lines 910 are sequentially numbered in a predetermined direction D starting from the $0^{th}$ first sensing line 910. The second sensing line 530 intersected with the $0^{th}$ first sensing line 910 at the starting latitudinal line SL is selected as the $0^{th}$ second sensing line 530, and the second sensing lines 530 are sequentially numbered in the predetermined direction D starting from the $0^{th}$ second sensing line 530. Moreover, a longitude of the $0^{th}$ second sensing line 530 is set as 0°, so a longitude coordinate of an intersection point between the $m^{th}$ first sensing line 910 and the $n^{th}$ second sensing line 530 is $n*2\pi/Q$, and a latitude coordinate is $MOD(((n-m)+Q)/Q,1)*\pi+\Delta 1$ st, wherein the number of the first sensing lines 910 is M+1, the number of the second sensing lines 530 is N+1, π is a radian, m is 0 to M, n is 0 to N, and Q is M+1 or N+1. Here, the symbol m is used to represent an order of a first sensing line 910 among all of the first sensing lines 910, and the symbol n is used to represent an order of a second sensing line 530 among all of the second sensing lines 530. In the present embodiment, the predetermined direction D is a counterclockwise direction. In other embodiments, the predetermined direction D may also be a clockwise direction.

In the present embodiment, any one of the first sensing lines 910 and any one of the second sensing lines 530 are intersected at one intersection point (e.g., an intersection point A5 in FIG. 9), and this intersection point may be used as a touch sensing point. A sensing method of the touch panel 900 may include inputting a driving signal to one of the first sensing lines 910 one after another, and simultaneously reading sensing signals of all of the second sensing lines 530. Alternatively, the sensing method may include inputting a driving signal to one of the second sensing lines 530 one after another, and simultaneously reading sensing signals of all of the first sensing lines 910.

Figure 10:
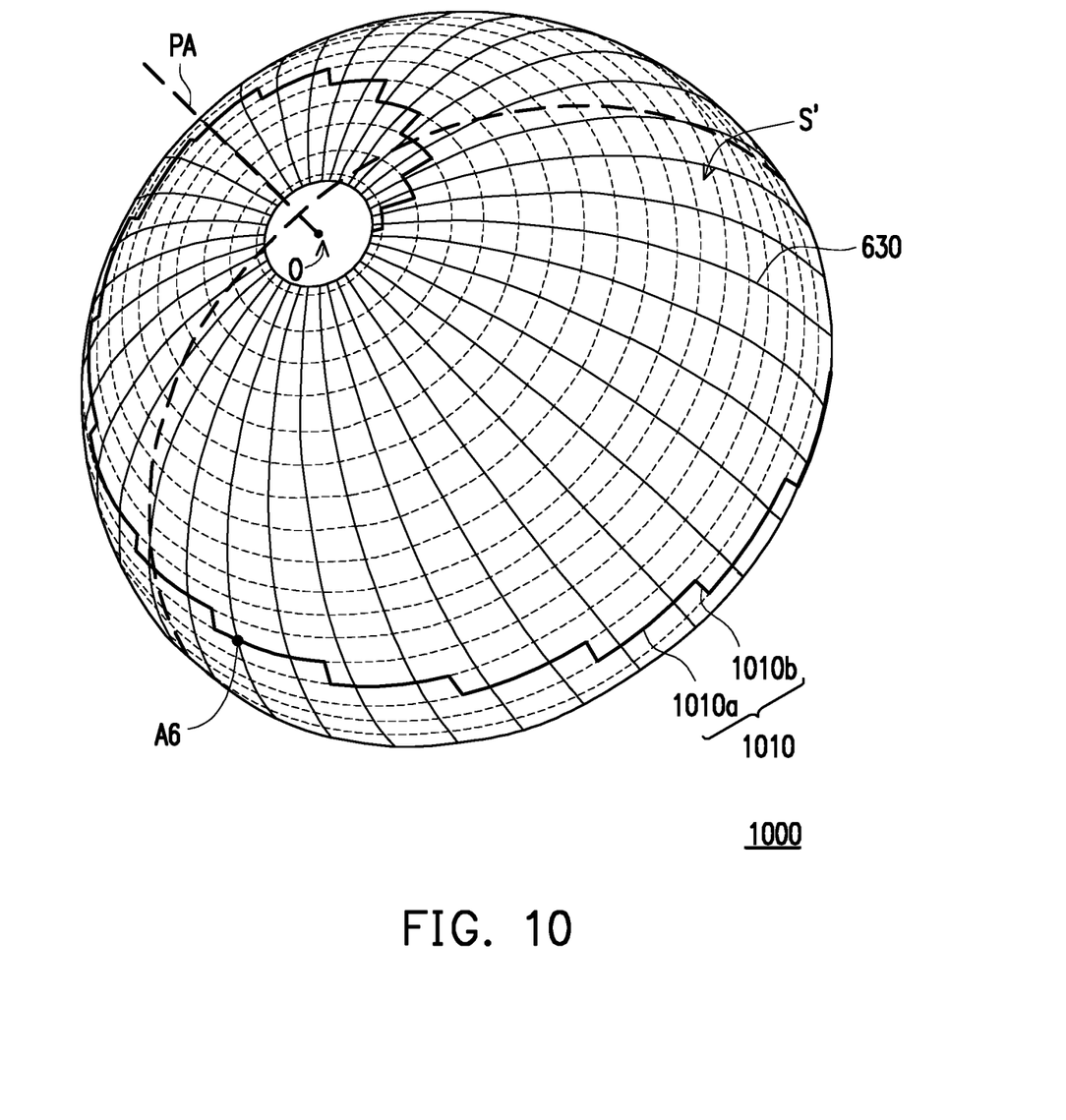
FIG. 10 is a schematic diagram illustrating a touch panel according to an embodiment of the invention.

FIG. 10 is a schematic diagram illustrating a touch panel according to an embodiment of the invention. Referring to FIG. 10, a touch panel 1000 includes a hemispherical surface S', and a polar axis PA of the hemispherical surface S' passes through a center O. First sensing lines 1010 and second sensing lines 630 of the touch panel 1000 are disposed on the hemispherical surface S'. The touch panel 1000 includes a plurality of first sensing lines 1010, but FIG. 10 only illustrates one of them to clearly present the distribution of the first sensing line 1010. Specifically, each of the first sensing lines 1010 includes a plurality of first arc segments 1010a extending along a direction of latitudinal lines (i.e., lines where planes perpendicular to the polar axis PA are intersected with the hemispherical surface S') and a plurality of first straight segments 1010b extending along a direction of longitudinal lines (i.e., lines where planes parallel to the polar axis PA and passing through the polar axis PA are intersected with the hemispherical surface S'). Each of the first straight segments 1010b is connected between two adjacent first arc segments 1010a. Different first arc segments 1010a have different radii about the center O (or the polar axis PA). The radii of the first arc segments 1010a are in a constant-difference relationship, and different first arc segments 1010a cover ranges of azimuth about the center O that are different and are not overlapped with each other. The second sensing lines 630 extend along the direction of longitudinal lines, are separated from each other, and are intersected with the first sensing lines 1010. In the present embodiment, one of the first arc segments 1010a of each of the first sensing lines 1010 is intersected with two of the second sensing lines 630. In other embodiments (not illustrated), the number of the second sensing lines 630 intersected with one of the first arc segments 1010a of each of the first sensing lines 1010 may also be one, three, or another number.

In the present embodiment, any one of the first sensing lines 1010 and any one of the second sensing lines 630 are intersected at one intersection point (e.g., an intersection point A6 in FIG. 10), and this intersection point may be used as a touch sensing point. A sensing method of the touch panel 1000 may include inputting a driving signal to one of the first sensing lines 1010 one after another, and simultaneously reading sensing signals of all of the second sensing lines 630. Alternatively, the sensing method may include inputting a driving signal to one of the second sensing lines 630 one after another, and simultaneously reading sensing signals of all of the first sensing lines 1010.

In summary of the above, the embodiments of the invention exhibit at least one of the advantages or effects below. Each of the first sensing lines of the touch panel of the embodiments of the invention includes a plurality of first arc segments and a plurality of first straight segments. Each of the first straight segments is connected between two adjacent first arc segments, and different first arc segments have different radii about a center. Therefore, each of the first sensing lines of the touch panel of the embodiments of the invention can extend to the periphery of the touch panel through the first arc segments and the first straight segments connected to each other, such that each of the first sensing lines can directly extend to the periphery without being led out via additionally disposed transmission lines. Accordingly, in the touch panel of the embodiments of the invention, the sensing lines can be distributed in all ranges of azimuth to achieve comprehensive touch functions. Moreover, in the touch panel of some embodiments of the invention, the range of angle covered by all of the first arc segments of more than one first sensing line is 2π. Therefore, the touch panel of the embodiments of the invention can input a driving signal simultaneously to more than one first sensing line and thus have a higher refresh rate and computation speed.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. A touch panel comprising: a plurality of first sensing lines separated from each other, wherein each of the first sensing lines comprises a plurality of first arc segments and a plurality of first straight segments, each of the first straight segments is connected between two adjacent first arc segments, different first arc segments have different radii about a center, and different first arc segments cover different ranges of azimuth about the center; and a plurality of second sensing lines separated from each other and intersected with the first sensing lines;

wherein a number of the second sensing lines is n, a number of the first sensing lines is i, one of the first arc segments of each of the first sensing lines is intersected with two of the second sensing lines, the first arc segment farthest away from the center in each of the first sensing lines is the $1^{st}$ first arc segment, one of the first sensing lines is selected as the $1^{st}$ first sensing line, and the first sensing lines are sequentially numbered counterclockwise starting from the $1^{st}$ first sensing line, of the two second sensing lines intersected with the $1^{st}$ first arc segment of the $1^{st}$ first sensing line, the second sensing line adjacent to an end of the $1^{st}$ first sensing line is used as the $1^{st}$ second sensing line, and the second sensing lines are sequentially numbered counterclockwise starting from the $1^{st}$ second sensing line, and if the $k^{th}$ first sensing line is intersected with the $m^{th}$ second sensing line, then polar coordinates of an intersection point are $(r_p, \Theta_m)$, wherein $r_p$ is a radius of the $p^{th}$ first arc segment of the $k^{th}$ first sensing line, p is an integer value of $((m+1)/2)+a-(k-1)n/2i$, and $\Theta_m$ is $MOD(2b(m-1)/n+2,2)*\pi$, wherein b is +1, a=0 when m>2(k-1), a=n/2 when m≤2(k-1), $\pi$ is a radian, and k, p, and m are all positive integers.

2. The touch panel according to claim 1, wherein the ranges of azimuth about the center covered by the first arc segments of each of the first sensing lines are not overlapped with each other.

3. The touch panel according to claim 1, wherein a number of the first sensing lines is equal to a number of the first arc segments of one single first sensing line.

4. The touch panel according to claim 1, wherein a number of the first sensing lines is smaller than a number of the first arc segments of one single first sensing line.

5. The touch panel according to claim 1, wherein a range of angle covered by the first arc segments of N first sensing lines is $2\pi$, wherein N is a positive integer.

6. The touch panel according to claim 1, wherein the radii of the first arc segments of each of the first sensing lines are in a constant-difference relationship.

7. The touch panel according to claim 1, wherein one of the first arc segments of each of the first sensing lines is intersected with multiple second sensing lines.

8. The touch panel according to claim 1, wherein two adjacent first arc segments of each of the first sensing lines respectively extend clockwise and extend counterclockwise from two ends of the connected first straight segment.

9. The touch panel according to claim 8, wherein of the two adjacent first arc segments, the first arc segment closer to the center extends counterclockwise from the connected first straight segment.

10. The touch panel according to claim 9, wherein
a number of the second sensing lines is n,
a number of the first sensing lines is i,
one of the first arc segments of each of the first sensing lines is intersected with one of the second sensing lines, the first arc segment farthest away from the center in each of the first sensing lines is the $1^{st}$ first arc segment, one of the first sensing lines is selected as the $1^{st}$ first sensing line, and the first sensing lines are sequentially numbered counterclockwise starting from the $1^{st}$ first sensing line,
the second sensing line intersected with the $1^{st}$ first arc segment of the $1^{st}$ first sensing line is used as the $1^{st}$ second sensing line, and the second sensing lines are sequentially numbered counterclockwise starting from the $1^{st}$ second sensing line, and
if the $k^{th}$ first sensing line is intersected with the $m^{th}$ second sensing line, then
polar coordinates of an intersection point are $(r_p, \Theta_m)$, wherein $r_p$ is a radius of the $p^{th}$ first arc segment of the $k^{th}$ first sensing line, p is an integer value of $m+a-(k-1)n/i$, $\Theta_m$ is $2\pi*(m-1)/n$, a=0 when m>2(k-1), a=n when m≤2(k-1), $\pi$ is a radian, and k, p, and m are all positive integers.

11. The touch panel according to claim 8, wherein of the two adjacent first arc segments, the first arc segment closer to the center extends clockwise from the connected first straight segment.

12. The touch panel according to claim 11, wherein
a number of the second sensing lines is n,
a number of the first sensing lines is i,
one of the first arc segments of each of the first sensing lines is intersected with two of the second sensing lines,
the first arc segment farthest away from the center in each of the first sensing lines is the $1^{st}$ first arc segment,
one of the first sensing lines is selected as the $1^{st}$ first sensing line, and the first sensing lines are sequentially numbered clockwise starting from the $1^{st}$ first sensing line,
of the two second sensing lines intersected with the $1^{st}$ first arc segment of the $1^{st}$ first sensing line, the second sensing line adjacent to an end of the $1^{st}$ first sensing line is used as the $1^{st}$ second sensing line, and the second sensing lines are sequentially numbered clockwise starting from the $1^{st}$ second sensing line, and
if the $k^{th}$ first sensing line is intersected with the $m^{th}$ second sensing line, then
polar coordinates of an intersection point are $(r_p, \Theta_m)$, wherein $r_p$ is a radius of the $p^{th}$ first arc segment of the $k^{th}$ first sensing line, p is an integer value of $((m+1)/2)+a-(k-1)n/2i$, and $\Theta_m$ is $MOD(2b(m-1)/n+2,2)*\pi$, wherein b is $-1$, a=0 when m>2(k-1), a=n/2 when m≤2(k-1), $\pi$ is a radian, and k, p, and m are all positive integers.

13. The touch panel according to claim 12, wherein the first sensing lines and the second sensing lines are disposed on a spherical surface, and a polar axis of the spherical surface passes through the center.

14. The touch panel according to claim 13, wherein among a plurality of intersection points of the first sensing lines and the second sensing lines, part of the intersection points closest to the center are located on a starting latitudinal line, and an included angle between a spherical radius of any one point of the spherical surface on the starting latitudinal line and the polar axis is $\Delta 1$ st degrees,
one of the first sensing lines is selected as the $0^{th}$ first sensing line, and the first sensing lines are sequentially numbered in a predetermined direction starting from the $0^{th}$ first sensing line,
the second sensing line intersected with the $0^{th}$ first sensing line at the starting latitudinal line is selected as the $0^{th}$ second sensing line, and the second sensing lines are sequentially numbered in the predetermined direction starting from the $0^{th}$ second sensing line, and
if a longitude of the $0^{th}$ second sensing line is set as $0°$, then
a longitude coordinate of the intersection point between the $m^{th}$ first sensing line and the $n^{th}$ second sensing line is $n*2\pi/Q$, and a latitude coordinate is $MOD(((n-m)+Q)/Q,1)*\pi+\Delta 1$ st, wherein a number of the first sensing lines is M+1, a number of the second sensing lines is N+1, π is a radian, m is 0 to M, n is 0 to N, and Q is M+1 or N+1.

15. The touch panel according to claim 14, wherein the predetermined direction is a clockwise direction or a counterclockwise direction.

16. The touch panel according to claim 12, wherein each of the second sensing lines comprises a plurality of second straight segments and a plurality of second arc segments, each of the second arc segments is connected between two adjacent second straight segments, different second arc segments have different radii about the center, the second straight segments are intersected with the first arc segments of the first sensing lines, and the second arc segments are intersected with the first straight segments of the first sensing lines.

17. The touch panel according to claim 16, wherein the second arc segments of each of the second sensing lines cover different ranges of angle.

18. The touch panel according to claim 16, wherein a number of the first sensing lines is identical to a number of the second sensing lines.

19. The touch panel according to claim 16, wherein a number of the second straight segments is inconsistent among the second sensing lines.

20. The touch panel according to claim 16, wherein a number of the first arc segments is inconsistent among the first sensing lines.

21. The touch panel according to claim 12, wherein the second sensing lines extend radially outward in straight lines from the center.

22. The touch panel according to claim 12, wherein the second sensing lines are a plurality of annular sensing lines concentrically arranged around the center, and the second sensing lines are intersected with the first straight segments of the first sensing lines.

* * * * *